United States Patent [19]

Samukawa et al.

[11] Patent Number: 5,704,544
[45] Date of Patent: Jan. 6, 1998

[54] AIR CONDITIONING APPARATUS WITH AN IMPROVED SUNLIGHT CORRECTION

[75] Inventors: Katsuhiko Samukawa, Obu; Yuji Honda, Okazaki, both of Japan

[73] Assignee: Nippondenso Co., Ltd., Kariya, Japan

[21] Appl. No.: 704,098

[22] Filed: Aug. 28, 1996

[30] Foreign Application Priority Data

Aug. 29, 1995 [JP] Japan ................. 7-220901
Jul. 2, 1996 [JP] Japan ................. 8-172555

[51] Int. Cl.$^6$ ........................................ F24F 7/00
[52] U.S. Cl. ............... 236/49.3; 236/91 C; 165/203; 356/222; 356/225
[58] Field of Search ................. 236/49.3, 91 C; 165/203; 356/221, 222, 225; 454/75

[56] References Cited

U.S. PATENT DOCUMENTS

| | | | |
|---|---|---|---|
| 4,760,772 | 8/1988 | Horiguchi et al. | 454/75 |
| 5,072,105 | 12/1991 | Osawa | 454/75 |
| 5,072,106 | 12/1991 | Osawa | 454/75 |
| 5,181,654 | 1/1993 | Yoshimi et al. | 236/91 C |
| 5,432,599 | 7/1995 | Orii et al. | 236/91 C |
| 5,553,661 | 9/1996 | Beyerlein et al. | 236/91 C |
| 5,553,775 | 9/1996 | Kato et al. | 236/91 C |

FOREIGN PATENT DOCUMENTS

A643028  2/1994  Japan.

*Primary Examiner*—William E. Tapolcai
*Attorney, Agent, or Firm*—Harness, Dickey & Pierce, PLC

[57] ABSTRACT

An air conditioning apparatus for a vehicle includes a first sunlight sensor disposed in a driver's seat side and a second sunlight sensor disposed in a passenger seat side space. The sunlight sensors are integrally formed with a filter and a Fresnel lens. When an elevation angle of sunlight is low, an inadequate correction of sunlight amounts is prevented by the Fresnel lens. Further, when sunlight enters the vehicle from the side, detected sunlight amounts detected by the first and second sunlight sensors are corrected so that a ratio or a difference between the detected sunlight amounts becomes large when the ratio or the difference is in a predetermined range. Therefore, when sunlight enters from the side, the correction of the detected sunlight amounts can be performed adequately so that passengers in the passenger compartment of the vehicle feel comfortable.

21 Claims, 8 Drawing Sheets

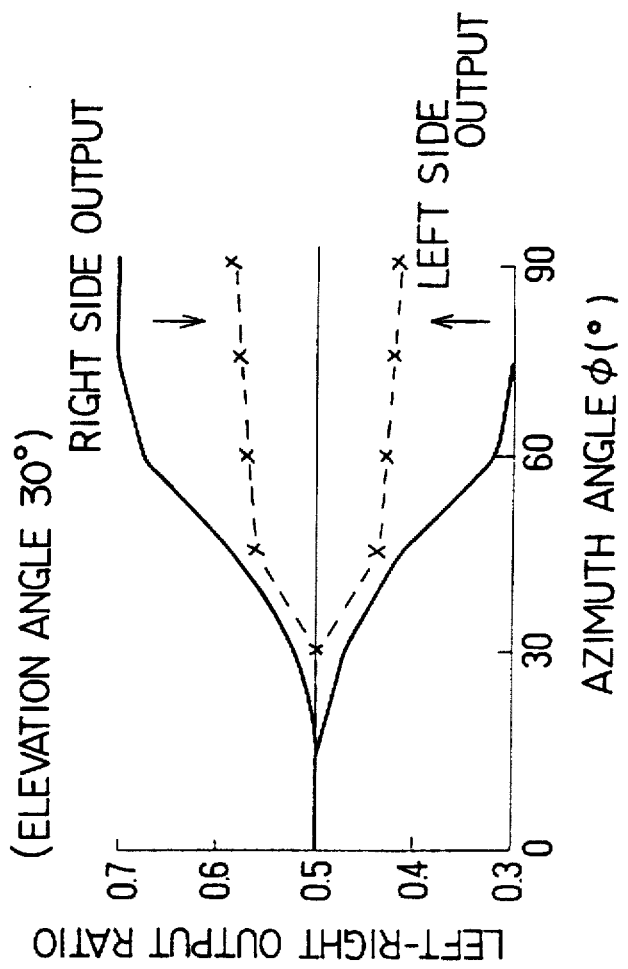
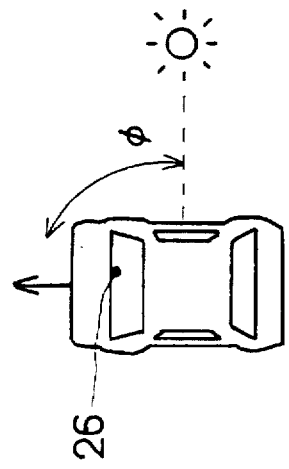
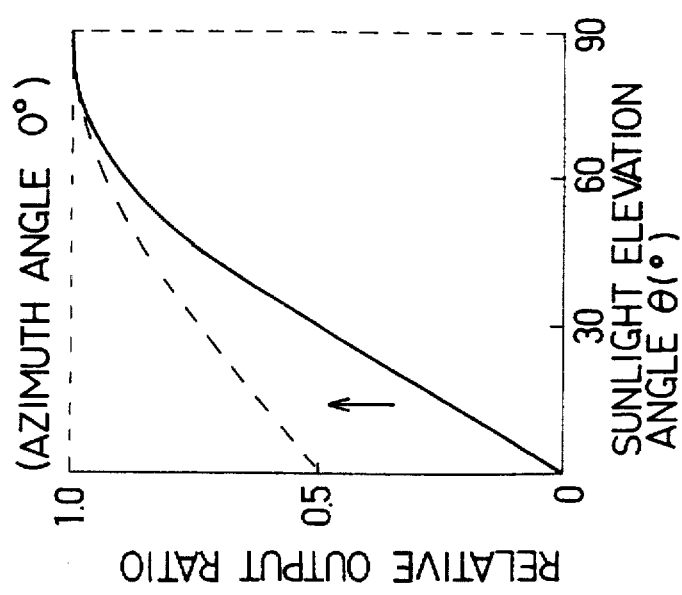
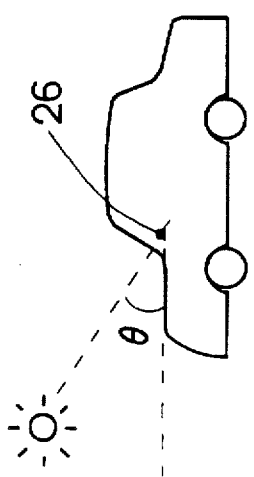

AIR CONDITIONING APPARATUS WITH AN IMPROVED SUNLIGHT CORRECTION

CROSS REFERENCE TO RELATED APPLICATIONS

This application is based upon and claims the benefit of priority of the prior Japanese Patent Applications No. Hei. 7-220901 filed on Aug. 29, 1995, and No. Hei. 8-172555 filed on Jul. 2, 1996, the contents of which are incorporated herein by reference.

BACKGROUND OF THE INVENTION

1. Field of the Invention

The present invention generally relates to an air conditioning apparatus for vehicles, which independently controls each temperature or each amount of conditioned air blown out into a passenger seat side space and a driver's seat side space in an passenger compartment. More particularly, the present invention relates to a correction of a sunlight amount detected by a sunlight sensor for controlling temperatures or amounts of conditioned air blown out into the passenger seat side space and the driver's seat side space in the passenger compartment.

2. Related Arts

Conventionally, various types of air conditioning apparatuses, which independently control each temperature or each amount of conditioned air blown out into a passenger seat side space and a driver's seat side space has been proposed. In one of such conventional apparatuses, a first and a second sunlight sensors for detecting amounts of sunlight which entered the passenger seat side space and the driver's seat side space, respectively, are provided, and a filter through which sunlight enters the first and second sunlight sensors is integrated with a Fresnel lens, as disclosed in JP-A-6-43028.

If the sunlight sensors is not integrally provided with the Fresnel lens, when an elevation angle of sunlight is small, the detected sunlight amount by the sensors are small, despite the passenger is exposed to the sunlight. Therefore, there occurs a problem that the passengers may feel hot.

When the sensors have the Fresnel lens as disclosed in JP-A-6-43028, the Fresnel lens changes a direction of sunlight so that each amount of sunlight which enters the first and second sunlight sensors is increased when the elevation angle of the sunlight is small. Accordingly, when the elevation angle of the sunlight is small, the detected sunlight amount is prevented from being insufficient so that the passengers do not feel hot.

However, as a result of studying and experimentation by the inventors, it has turned out that the above conventional type has the following problems. That is, since each of the first and second sunlight sensors is integrally provided with the Fresnel lens at a sunlight incidence side thereof, when the sunlight enters the passenger compartment from the side of the vehicle, e.g., the side of the driver's seat, amounts of sunlight which enter the first and second sunlight sensors become approximate value each other by an action of changing the sunlight direction (prismatic action) with the Fresnel lens. Accordingly, an output ratio between the detected sunlight amounts by the first and second sunlight sensors becomes small. Therefore, there occurs a problem that a driver on the driver's seat side exposed to the sunlight may feel hot due to an insufficient correction of the sunlight amount.

On the contrary, it has turned out that there occurs another problem that the passenger on the passenger seat side where the sunlight does not enter directly may feel cold due to an excessive correction of the sunlight amount.

SUMMARY OF THE INVENTION

The present invention has been accomplished in view of the above mentioned problems and it is an object of the present invention to provide an air conditioning system for a vehicle, capable of performing an adequate correction of a sunlight amount when a sunlight enters a passenger compartment of the vehicle from the side of the vehicle as well as when an elevation angle of the sunlight is small.

It is another object of the present invention to provide an air conditioning system for a vehicle, capable of providing comfortable feeling of conditioned air for a passenger in a passenger compartment of the vehicle.

According to the present invention, an air conditioning apparatus includes a first and second sunlight sensors for detecting each amount of sunlight which enters a driver's seat side space and a passenger seat side space in a passenger compartment and outputting sunlight amount signals according to the detected values, and a sunlight direction is changed so that the amounts of sunlight which enters to the first and second sunlight sensors becomes larger when an elevation angle of sunlight which enters to the passenger compartment is small. Further, states of conditioned air blown out into said driver's seat side space and said passenger seat side space are independently controlled.

In the air conditioning apparatus according to the present invention,, a first and second target value of air blown out into the driver's seat side space and the passenger seat side space are calculated on the basis of interior environmental factors including the sunlight amounts to be detected by the first and second sunlight sensors, and at least one of the target values is corrected so that a difference between the states of air blown out to the driver's seat side space and the passenger seat side space becomes larger when a ratio or a difference between the sunlight amount signals is within a predetermined range.

Further, at least one of the sunlight amount signals of the first and second sunlight sensors is corrected so that the ratio or the difference between, the sunlight amount signals becomes larger when the ratio or the difference between the sunlight amount signals is within a predetermined range.

Accordingly the state of the conditioned air blown out to the driver's seat side space and the passenger seat side space are independently controlled on the basis of interior environmental factors including the sunlight amounts corrected as the above. As a result, when the sunlight enters the passenger compartment from the side, even if the sunlight direction is changed, the correction of sunlight can be performed adequately, and thereby the states of conditioned air blown out to the driver's seat side space and the passenger seat side space can be independently controlled without causing an inadequate correction or an excessive correction so that the passengers feel comfortable.

Here, the interior environmental factors means physical values affecting interior environment in the passenger compartment such as outside air temperature, inside air temperature, or the like. The state of conditioned air includes all factors affecting the air state such as temperature, humidity, air amount, or distribution of air blown out to the driver's seat side space and the passenger seat side space.

Further, when the sunlight amount signals are within a predetermined range, the sunlight amount signals are not corrected. Therefore, when the sunlight enters to the passenger compartment from the front, the output ratio or the difference, between the sunlight amount signals can be prevented form being increased on the basis of a variation of the sunlight amount signals of the sensors or a variation of positions where the sunlight sensors are installed, whereby the states of conditioned air can be controlled adequately.

Furthermore, the sunlight amount signals are corrected by means of calculating of a correction coefficient on the basis of the ratio or the difference, between the sunlight amount signals. Further, the correction coefficient is kept at an upper limit value when the ratio or the difference, between the sunlight amount signals is equal to a predetermined value or more, while kept at a lower limit value when the ratio or the difference of the sunlight amount signals is lower than a predetermined value. Therefore, the ratio or the difference between the sunlight amount signals after the correction can be prevented from being increased excessively.

BRIEF DESCRIPTION OF THE DRAWINGS

The present invention will become more fully understood from the detailed description given hereinbelow and the accompanying drawings which are given by way of illustration only and are not intended to limit the present invention, and wherein:

FIG. 6A is a graph showing a relative output ratio between detected sunlight amounts by the sunlight sensors with reference to a sunlight elevation angle in the first embodiment;

FIG. 6B is a graph showing a left-right output ratio between the sensor outputs for the detected sunlight amounts by the sunlight sensors with reference to a sunlight azimuth angle in the first embodiment;

DETAILED DESCRIPTION OF THE PRESENTLY PREFERRED EXEMPLARY EMBODIMENTS

Embodiments according to the present invention will be described with respect to the drawings.

A first embodiment of the present invention will be described.

Figure 1:
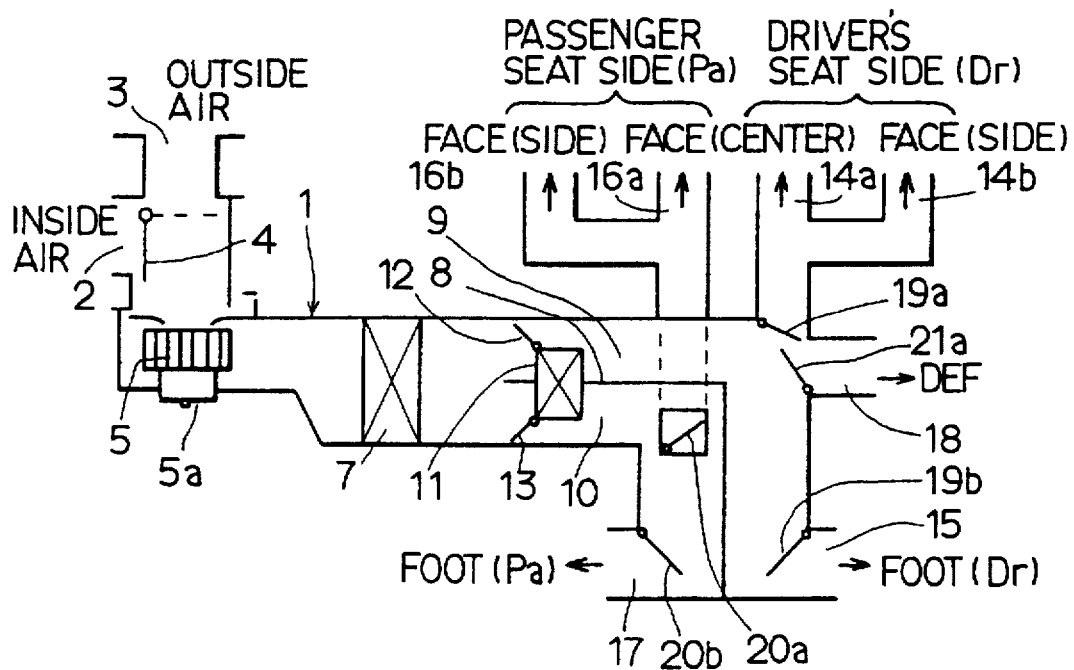
FIG. 1 is a diagram showing an airflow system of an air conditioning apparatus according to a first embodiment of the present invention.

FIG. 1 schematically shows an airflow system of the first embodiment in which the present invention is applied to an air conditioning apparatus for a vehicle. The airflow system is constituted so as to independently control each temperature of conditioned air blown out into a driver's seat side space and a passenger seat side space in a passenger compartment in the vehicle.

Figure 2:
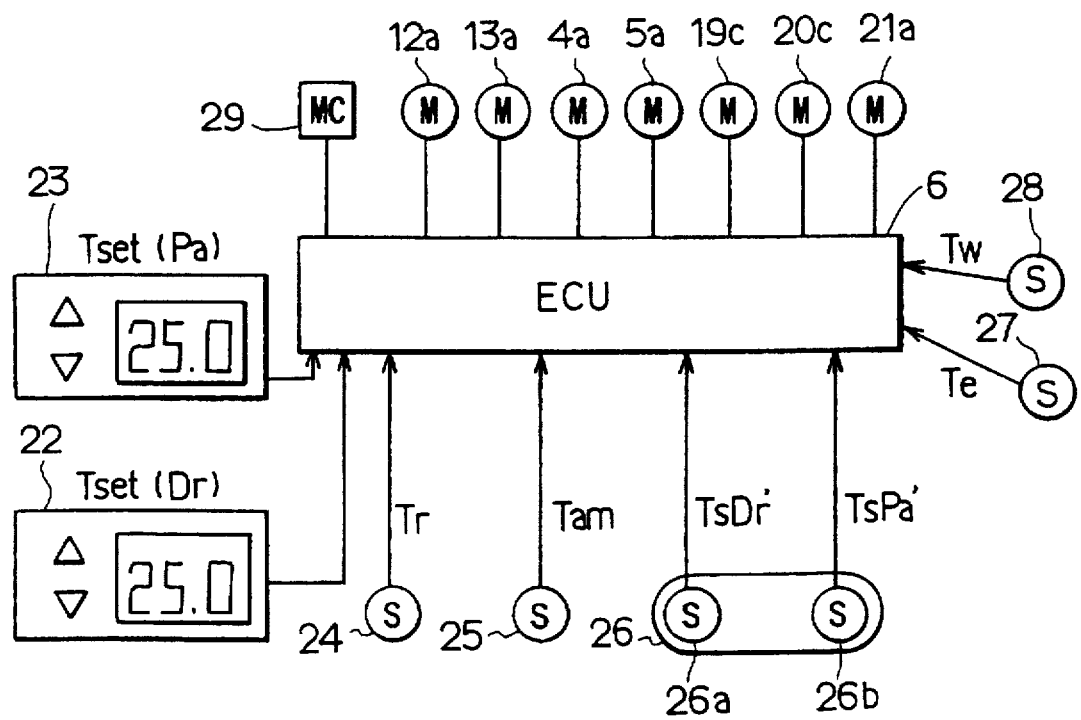
FIG. 2 is a block diagram showing a control unit (ECU) in the first embodiment.

FIG. 2 shows an electric control system including an air conditioning control unit 6 (hereinafter simply called ECU 6) for controlling driver's seat side air conditioning means and passenger seat side air conditioning means independently.

As shown in FIG. 1, on an air upstream side, an air conditioning case 1 is formed with an air inlet 2 for sucking inside air in the passenger compartment, an air inlet 3 for sucking outside air, and an inside/outside air switching door 4 for selectively opening or closing the air inlets 2 and 3. The inside/outside air switching door 4 is driven by a servomotor 4a shown in FIG.2.

A centrifugal type blowing fan 5 is disposed in the air conditioning case 1 on an air downstream side of the inside/outside air switching door 4 as air blowing means. The blowing fan 5 is driven by a fan motor 5a and a rotational speed of the fan 5, i.e., an amount of air blown out into the passenger compartment is controlled by a voltage applied to the fan motor 5a. The applied voltage is determined by means of the ECU 6 shown in FIG. 2.

On an air downstream side of the fan 5 in the air conditioning case 1, an evaporator 7 is disposed as air cooling means. The evaporator 7 constitutes a refrigerating cycle with a compressor driven by an engine of the vehicle, condenser, pressure reducing means, and the like.

On an air downstream side of the evaporator 7 in the air conditioning case 1, a partition plate 8 is disposed so that an air passage is divided into a driver's seat side air passage 9 for introducing air to the left side of the front seats in the passenger compartment, i.e., to the driver's seat side, and a passenger seat side air passage 10 for introducing air to the right side of the front seats in the passenger compartment, i.e., to the passenger seat side.

A heater core 11 as air heating means is disposed on the air downstream side of the evaporator 7 in the air passages 9 and 10. Cooling water of the engine flows within the heater core 11 so that the air passing through the heater core 11 is heated by cooling water as a heat source.

Air mix doors 12 and 13 are disposed in each of the air passage 9 and 10 on an air upstream side of the heater core 11. The doors 12 and 13 are respectively driven by servomotors 12a and 13a (see FIG. 2) to respectively adjust an ratio of air amounts flowing into the air passage 9 and 10.

Further, driver's seat side face air outlets 14a and 14b for blowing out air toward the upper half of the body of the passenger on the driver's seat side, and a driver's seat side foot air outlet 15 for blowing out air toward the feet of the passenger on the driver's seat side are formed on an air downstream end of the air passage 9. Passenger seat side face air outlets 16a and 16b for blowing out air toward the upper half of the body of the passenger on the passenger seat side, and a passenger seat side foot air outlet 17 for blowing out air toward the feet of the passenger on the passenger seat side are formed on an air downstream end of the air passage 10.

Further, a defroster air outlet 18 for blowing out air toward an inside surface of a windshield glass is also formed on the air downstream end of the air passage 9.

Air outlet mode switching door 19a is disposed on the air upstream sides of the driver's seat side air outlets 14a and 14b, and air outlet mode switching door 19b is disposed on the air upstream sides of the driver's seat side air outlet 15. The doors 19a and 19b are driven by a servomotor 19c (see FIG. 2). Similarly, air outlet mode switching door 20a is disposed on the air upstream sides of the passenger seat side air outlets 16a and 16b, and air outlet mode switching door 20b is disposed on the air upstream sides of the passenger seat side air outlet 17. The doors 20a and 20b are driven by a servomotor 20c (see FIG. 2). Further, a defroster mode door 21 is disposed on an air downstream side of the defroster air outlet 18, and driven by a servomotor 21a (see FIG. 2).

Next, a constitution of a control system according to the embodiment will be described referring to FIG. 2.

The ECU 6 controls each air conditioning means in the above mentioned airflow system of the air conditioning apparatus. A driver's seat side temperature setting device 22 for setting a required temperature Tset(Dr) on the driver's seat side by the passenger, and a passenger seat side temperature setting device 23 for setting a required temperature Tset(Pa) on the passenger seat side by the passenger are connected to the ECU 6, so that the setting temperatures are input to the ECU 6.

Further, an inside air temperature sensor 24 for detecting an inside air temperature Tr in the passenger compartment, an outside air temperature sensor 25 for detecting an outside air temperature Tam, a sunlight sensor 26 for detecting an amount of sunlight which enters the passenger compartment, an evaporator air temperature sensor 27 for detecting a temperature Te of the air just blown out from the evaporator, a cooling water temperature sensor 28 for detecting a temperature Tw of the cooling water flowing into the heater core 11, and the like, are connected to the ECU 6.

The sunlight sensor 26 includes a driver's seat side sunlight sensor 26a (first sunlight amount detecting means) for detecting a sunlight amount TsDr' on the driver's seat side, and a passenger seat side sunlight sensor 26b (second sunlight amount detecting means) for detecting a sunlight amount TsPa' on the passenger seat side. Further, the ECU 6 controls an electromagnetic clutch for intermitting an operation of the compressor in the refrigerating cycle.

The ECU 6 includes a microcomputer having CPU, ROM, RAM and the like (not shown) therein. Signals from the sensors 24–28 are input to the microcomputer after analogue-digital conversion by an input circuit (not shown) in the ECU 6. The ECU 6 is supplied electric power from a battery (not shown) when an ignition switch (not shown) of the engine of the vehicle is turned on.

In the operation for the air conditioning control, the sunlight sensors 26a and 26b detect the sunlight amounts so as to correct the thermal feeling, which is changed by the sunlight amount, of the passenger. Specific constitution of the sunlight sensor 26 in the embodiment will be described as below.

An output ratio between the detected sunlight amounts by the sunlight sensors 26a and 26b are changed in response to an azimuth angle of the sunlight in addition to the detected sunlight amount so as to independently control the air blown out to the driver's seat side space and the passenger seat side space in the passenger compartment. The azimuth angle φ is an angle of the direction of sunlight which enters the passenger compartment from the side of the vehicle with respect to the travelling direction of the vehicle as shown in FIG. 6b.

Figure 3:
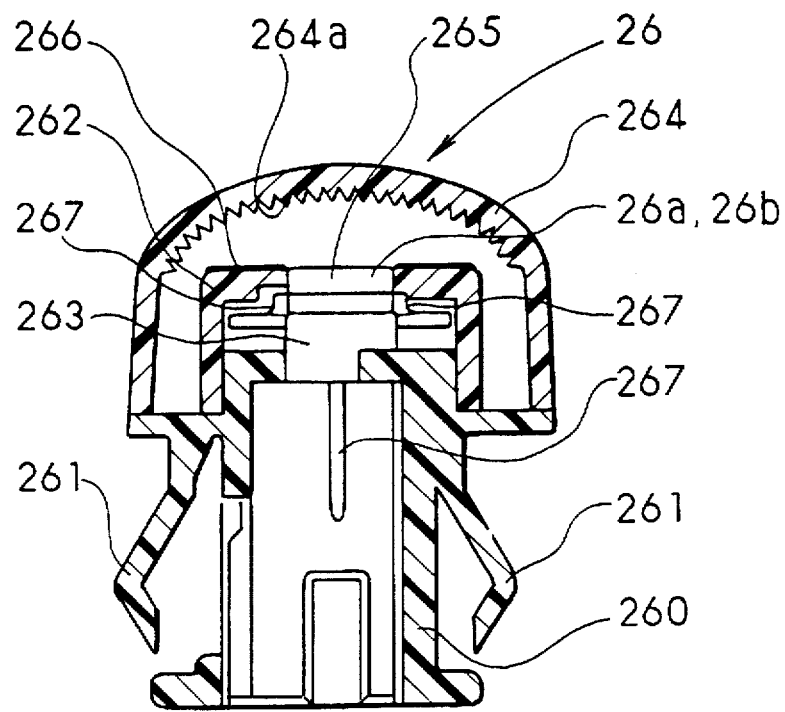
FIG. 3 is a fragmentary sectional view of a sunlight sensor in the first embodiment.

As shown in FIG. 3, the sunlight sensor 26 includes a casing member 260 made of elastic resin into a cylindrical shape. The casing member 260 is integrally formed with several elastic fixing pieces 261. Therefore, the sunlight sensor 26 can be fixed to suitable position, e.g., to upper surface of an instrument panel (not shown), just by fitting the fixing pieces 261 with a hand.

The sunlight sensor 26 also includes a holding tube 262 for holding the first and second sunlight sensors 26a and 26b and a holding stand 263 for mounting the first and second sunlight sensors 26a and 26b. The first and second sunlight sensors 26a and 26b are disposed on an upper side of the casing member 260 by means of the holding tube 262 and the holding stand 263.

A filter member 264 is disposed on the casing member 260 so as to cover the sunlight sensors 26a and 26b. The filter member 264 is made of transparent resin material through which the transmitted sunlight passes toward the sunlight sensors 26a and 26b, and is formed into a hemispherical shape. The filter member 264 transmits only the sunlight of which wavelength is within a predetermined range, thus selecting the sunlight which enters the sunlight sensors 26a and 26b.

Further, the filter member 264 is integrally formed with a Fresnel lens 264a on its inner surface. The Fresnel lens 264a performs prismatic action of changing (refracting) the direction of the sunlight which enters the sunlight sensors 26a and 26b so as to increase the sunlight amount when an elevation angle θ of the sunlight is small (referred to FIG. 6A). Therefore, in the embodiment, the Fresnel lens 264a constitutes sunlight direction changing means.

Figure 4:
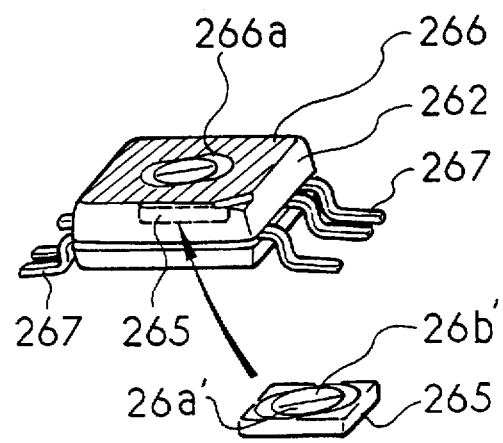
FIG. 4 is a perspective view showing a main part of the sunlight sensor shown in FIG. 3.
Figure 5:
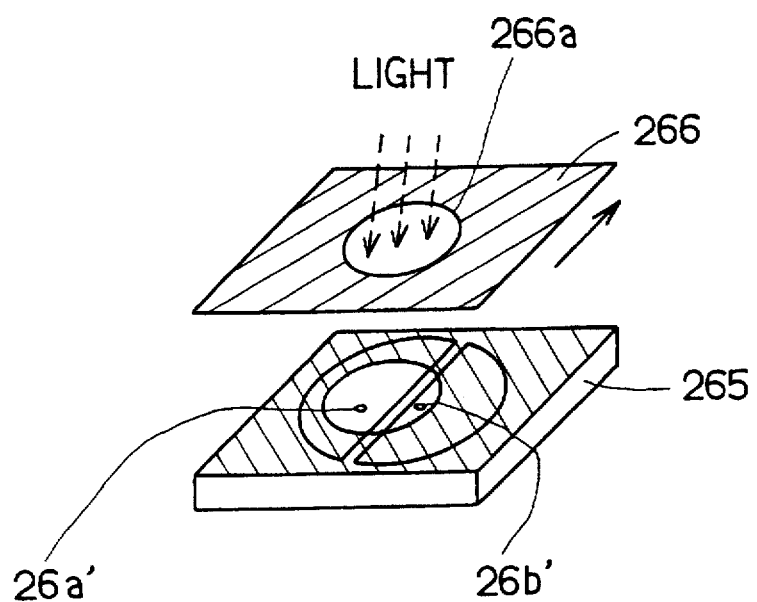
FIG. 5 is a perspective view showing a sensor element part of the sunlight sensor shown in FIGS. 3 and 4.

As shown in FIGS. 4 and 5, the sunlight sensors 26a and 26b include a first and second sunlight sensor elements 26a' and 26b' electrically independently formed on an insulating substrate (chip) 265. Further, a shading layer 266 having a sunlight transmitting hole 266 with a predetermined area is formed on an upper surface of the holding tube 262 so as to be positioned on the sensor elements 26a' and 26b' as shown in FIGS. 3 and 4.

The sensor elements 26a' and 26b' are connected to plural terminals 267 for the electrical connection with an outside circuit.

As shown in FIG. 5, the first sensor element 26a' is disposed on the left of the vehicle as a driver's seat side (left) detecting member and the second sensor element 26b' is disposed on the right of the vehicle as a passenger seat side (right) detecting member. The sensor elements 26a' and 26b' includes photodiodes, output current of which is proportional to the sunlight amount.

According to the constitution, only the sunlight having passed through the sunlight transmitting hole 266 of the shading layer 266 enters the right and left sensor elements 26a' and 26b'. Therefore, each output current of the right and left sensor elements 26a' and 26b' is changed in response to the irradiated area and the intensity of the sunlight having passed through the sunlight transmitting hole 266a of the shading layer 266.

Output characteristics of the right and left sensor elements 26a' and 26b' with respect to the direction of the sunlight when the Fresnel lens 264a is not disposed are shown by solid lines in FIGS. 6A and 6B. Concerning the sunlight elevation angle θ, as shown in FIG. 6A, the larger the sunlight elevation angle θ becomes, the larger the sensor relative output ratio between the detected sunlight amounts by the sunlight sensor elements 26a' and 26b' becomes. Further, concerning the sunlight azimuth angle φ, as shown in FIG. 6B, the larger the sunlight azimuth angle φ becomes, the larger the output difference between the detected sunlight amounts detected by the right and left sensor elements 26a' and 26b' becomes. Here, the characteristics in FIG. 6A is under such conditions as the azimuth angle φ is 0°. The characteristics in FIG. 6B is under such conditions as the elevation angle θ is 30° and the azimuth angle is less than 90°.

Output characteristics of the right and left sensor elements 26a' and 26b' when the Fresnel lens 264a is disposed are shown by broken lines in FIGS. 6A and 6B. The Fresnel lens 264a changes the direction of the sunlight entering the right and left sensor elements 26a' and 26b' by the prismatic action, and the sunlight amount can be thereby increased. Therefore, when the elevation angle θ is low, the relative output ratio between the detected sunlight amounts by the sensors is improved from the solid line to the broken line as shown in FIG. 6A.

On the contrary, when the sunlight enters the passenger compartment from the right or left side, the amounts of sunlight which enters the right and left sunlight sensor elements 26a' and 26b' are uniformed by the prismatic action of the Fresnel lens 264a. Consequently, the output difference between the detected sunlight amounts detected by the right and left sunlight sensor elements 26a' and 26B' becomes small as indicated by the broken lines in FIG. 6B. While the output difference between the detected sunlight amounts detected by the right and left sunlight sensor elements 26a' and 26b' is reduced as indicated by the broken lines in FIG. 6B, there still remains a difference which can be used, as described below to adjust the air conditioning apparatus between the driver's seat side and the passenger seat side.

Therefore, when the sunlight enters the passenger compartment from the right side (driver's seat side), the passenger in the driver's seat side space may feel hot due to the insufficient sunlight amount correction, whereas the passenger in the passenger seat side space may feel cool due to the excessive sunlight amount correction.

Therefore, in the embodiment according to the present invention, the air conditioning apparatus corrects the detected sunlight amount to control each amount or each temperature of air blowing out to the driver's seat side space and passenger seat side space independently so that the passengers feel comfortable even when the sunlight enters from the side.

Figure 7:
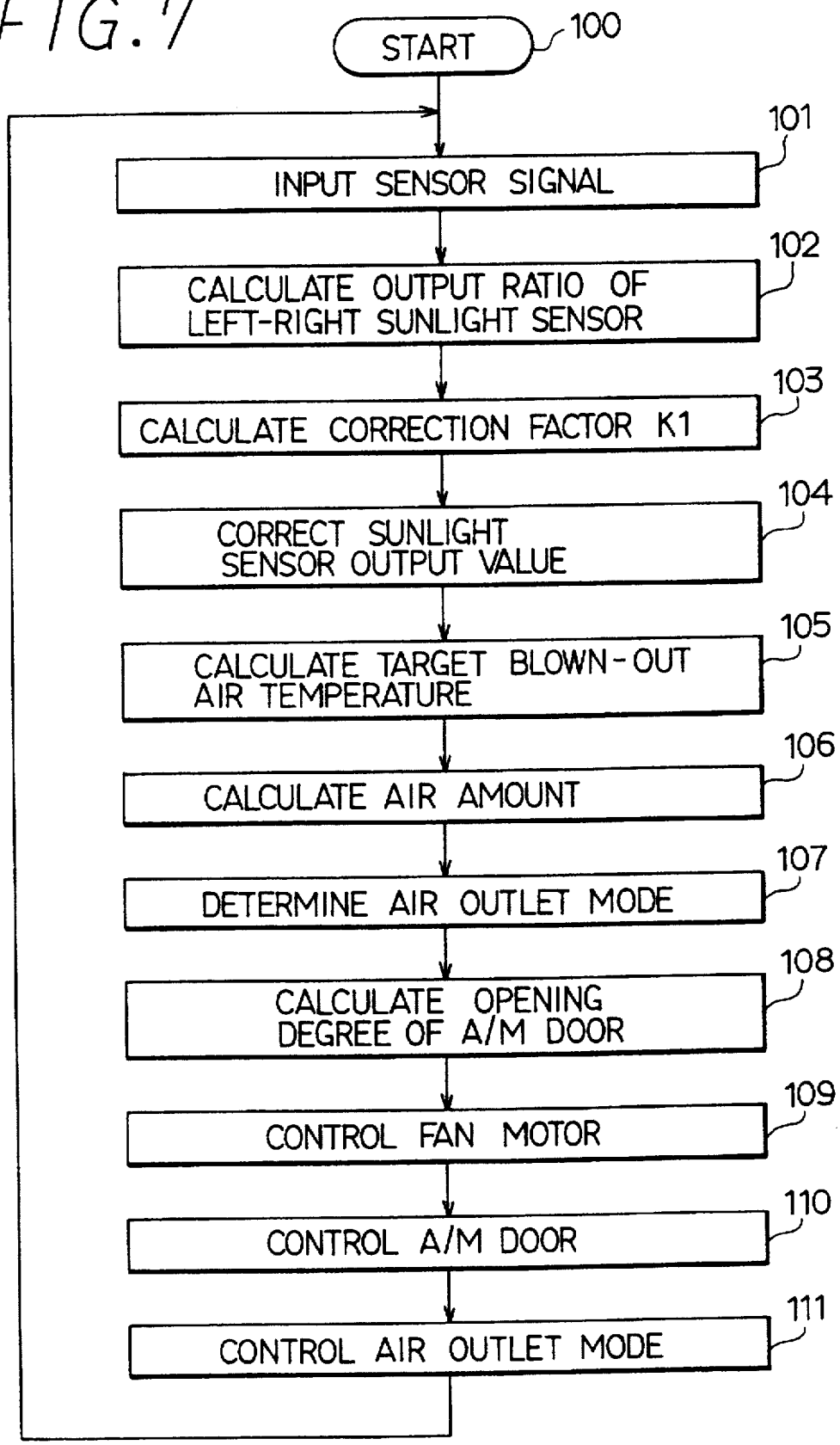
FIG. 7 is a flow chart showing a control system by ECU in the first embodiment.

Next, an operation for controlling an amount or temperature of air will be described referring to a flow chart in FIG. 7. When an automatic air conditioning mode is selected, firstly, an automatic control process of the air conditioning apparatus is started in a step 100. In a step 101, each of the output signals, i.e., the temperature setting Signals Tset(Dr) and Tset(Pa) from the temperature setting devices 22 and 23, the signals Tr, Tam, TsDr', TsPa', Te, and Tw from the inside air temperature sensor 24, the outside air temperature sensor 25, the sunlight sensor 26a and 26b, the evaporator air temperature sensor 27 and the cooling water temperature sensor 28, is input to the ECU 6.

In the next step 102, the output ratio between the sensor outputs for detected sunlight amounts by the right and left sunlight sensor elements 26a' and 26b' is calculated by the sensor outputs TsDr' and TsPa' on the basis of the following formula (1).

Left-right sensor output ratio=TsDr'/(TsDr'+TsPa')  (1)

Figure 8:
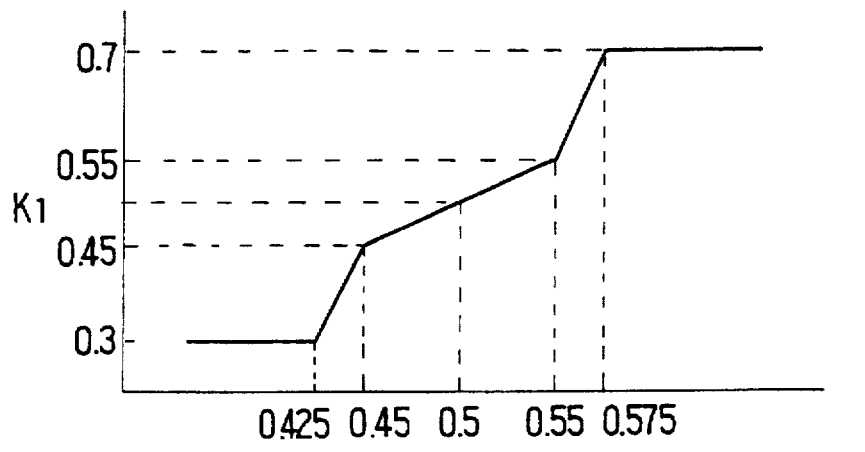
FIG. 8 is a graph for calculating a correction coefficient K1 in the first embodiment.

Next, in a step 103, a correction coefficient K1 is determined from the output ratio and a correction graph shown in FIG. 8. The correction graph in FIG. 8 is stored in the ROM in advance, in which the output ratio between the sensor outputs for the detected sunlight amounts by the right and left sunlight sensor elements 26a' and 26b' is increased. However, the correction graph is set so that the output ratio is not changed before and after the correction (in other words, the correction is prohibited) when the output ratio is in the middle region of 0.45–0.55. When the sunlight is entered from the front (the azimuth angle φ is 0°), although the output ratio should be almost 0.5, the output ratio may be changed by a variation in the detected amounts detected by the sensor elements 26a' and 26b' or a variation in the positions where the sensor elements 26a' and 26b' are installed. Therefore, when the sunlight enters passenger compartment from the front, the output ratio between the sensor outputs for the detected sunlight amounts by the sensor elements 26a' and 26b' is prevented from being increased, so that the output ratio between the sensor outputs for the detected sunlight amounts by the sensor elements 26a' and 26b' is kept to be almost 0.5.

On the other hand, in the correction graph in FIG. 8, to prevent the output ratio between the sensor outputs for the detected sunlight amounts by the sensor elements 26a' and 26b' from being increased excessively, the correction coefficient K1 is set to keep an upper limit value (0.7 in the embodiment) when the output ratio is equal to a predetermined value (0.575 in the embodiment) or more, while it is set to keep a lower limit value (0.3 in the embodiment) when the output ratio is less than a predetermined value (0.425 in the embodiment).

Next, in a step 104, the corrected detected sunlight amounts TsDr and TsPa are calculated from the correction coefficient K1 determined as the above and the sensor detected sunlight amounts TsDr' and TsPa' with the following formulas (2) and (3).

$$TsDr = K1 \times (TsDr' + TsPa') \quad (2)$$

$$TsPa = (1 - K1) \times (TsDr' + TsPa') \quad (3)$$

Figure 9:
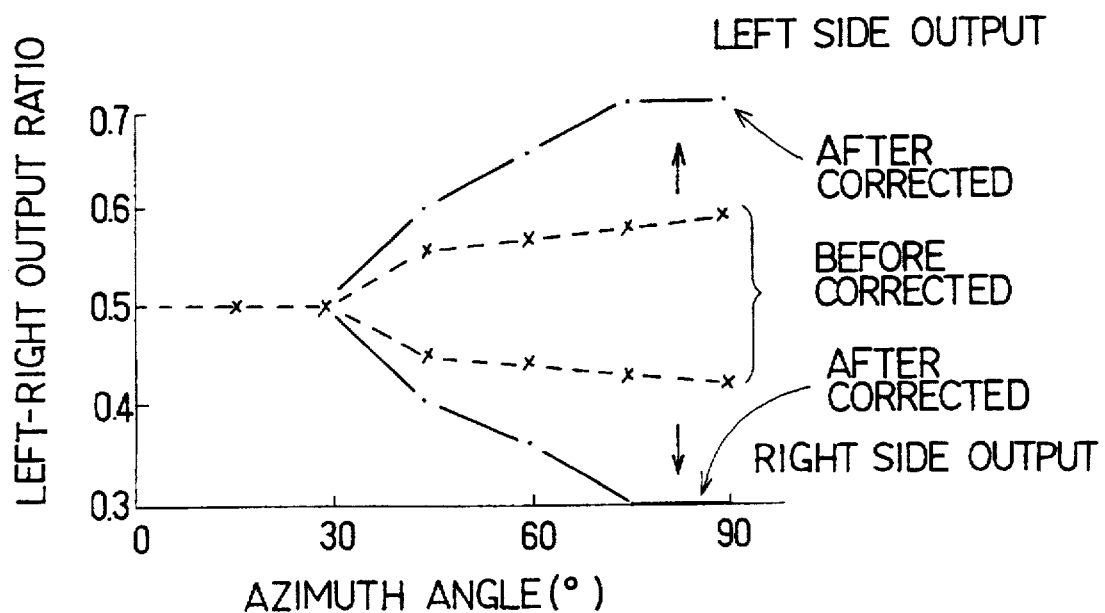
FIG. 9 is a graph showing the left-right output ratio between the sensor outputs for the detected sunlight amounts by the sunlight sensors with reference to the sunlight azimuth angle before and after correction in the first embodiment.

Accordingly, the sensor detected sunlight amounts are corrected, and the left-right sensor output ratio is thereby improved as shown in FIG. 9 when the azimuth angle φ is larger than 30°.

In the next step 105, target temperatures TAO(Dr) and TAO(Pa) of air blown out into the driver's seat side space and the passenger seat side space in the passenger compartment are calculated on the basis of the following formulas (4) and (5).

$$TAO(Dr) = Kset \times Tset(Dr) - Kr \times Tr - Kam \times Tam - Ks \times Ts(Dr) + C \quad (4)$$

$$TAO(Pa) = Kset \times Tset(Pa) - Kr \times Tr - Kam \times Tam - Ks \times Ts(Pa) + C \quad (5)$$

Wherein, Kset is a temperature setting gain, Kr is a inside air temperature gain, Kam is a outside air temperature gain, Ks is a sunlight amount gain, and C is a constant for correction.

Figure 10:
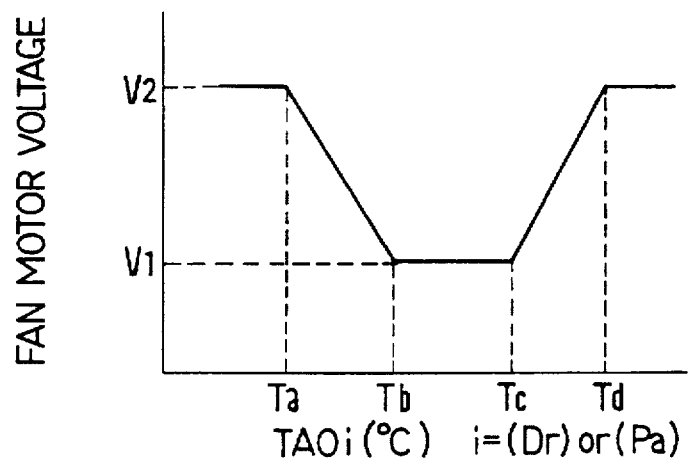
FIG. 10 is a graph showing a fan motor voltage with reference to a target blown-out air temperature (TAOi) in the first embodiment.
Figure 11:
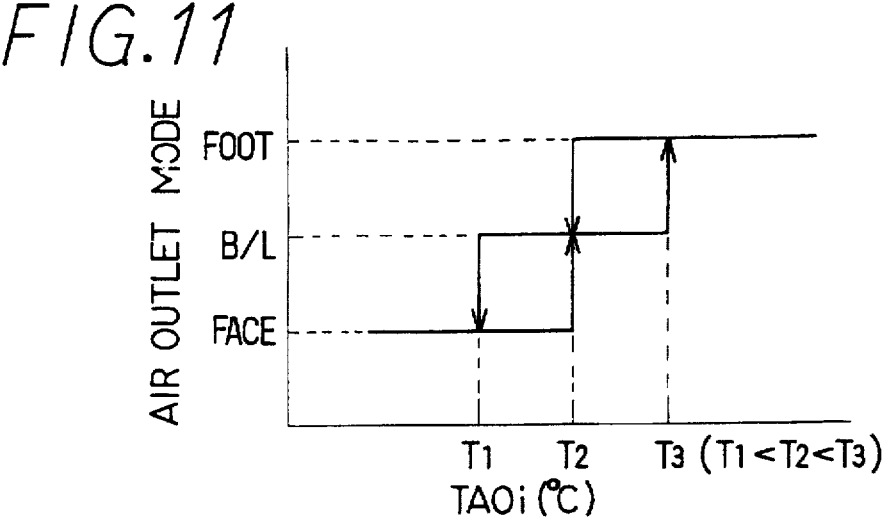
FIG. 11 is a graph showing a characteristics between an air outlet mode and a target blown-out air temperature (TAOi) in the first embodiment.

In the next step 106, a driver's seat side blowing fan voltage VA(Dr) and a passenger seat side blowing fan voltage VA(Pa) are determined on the basis of the TAO(Dr) and the TAO(Pa) calculated in the step 105 and a graph shown in FIG. 10. Thereafter, an average voltage of the blowing fan voltages VA(Dr) and VA(Pa) is calculated as an actual blowing fan voltage (target voltage) for applying to the fan motor 5a of the blowing fan 5, thereby controlling the air amount. In FIGS. 10 and 11, i means the driver's seat side (Dr) or the passenger seat side (Pa).

In the next step 107, the air outlet mode is determined on the basis of the TAO(Dr) and the TAO(Pa) as shown in FIG. 11. Here, a face (FACE) mode is a mode for generally blowing out cool air toward the upper half of the body of the passenger from the face air outlets 14a, 14b, 16a, and 16b, a foot (FOOT) mode is a mode for generally blowing out hot air toward the feet of the passenger from the foot air outlets 15 and 17, and a bilevel (B/L) mode is a mode for generally blowing out cool air from the face air outlets 14a, 14b, 16a, and 16b and for generally blowing out hot air from the foot air outlets 15 and 17 at the same time.

A defroster mode for generally blowing out hot air toward the inside surface of the windshield glass is not determined by TAO, but by turning on a defroster switch provided on the air conditioning control panel.

Next, in a step 108, a target opening degree SW(Dr) of the air mix door 12 on the driver's seat side and a target opening degree SW(Pa) of the air mix door 13 on the passenger seat side are calculated on the basis of the following formulas (6) and (7).

$$SW(Dr) = \{(TAO(Dr)-Te)/(Tw-Te)\} \times 100 \ (\%) \quad (6)$$

$$SW(Pa) = \{(TAO(Pa)-Te)/(Tw-Te)\} \times 100 \ (\%) \quad (7)$$

Wherein, Tw (°C.) is a cooling water temperature, and Te (°C.) is an evaporator blow-out air temperature.

Next, in steps 109, 110, and 111, each of the actuators 5a, 12a, 13a, 19c, and 20c is controlled to be the target value on the basis of the value calculated in the above steps 106, 107, and 108.

A second embodiment of the present invention will be described.

Figure 12:
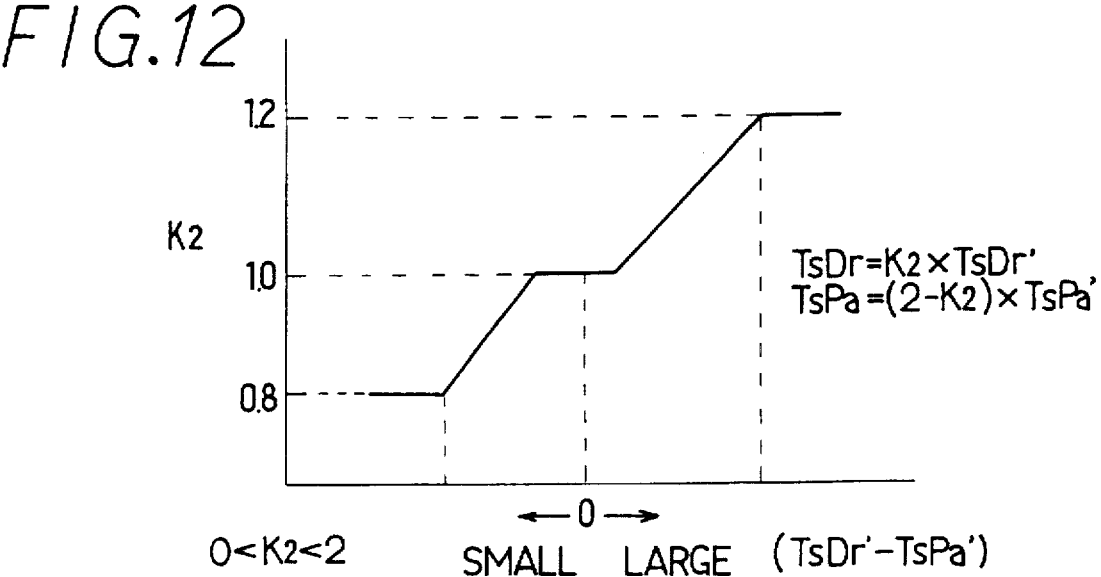
FIG. 12 is a graph for calculating a correction coefficient K2 in a second embodiment of the present invention.

In the first embodiment, the output ratio between the sensor outputs for the detected sunlight amounts by the left and right sensor elements 26a' and 26b' are calculated, the correction coefficient K1 is calculated on the basis of the output ratio, and the output ratio are corrected. In the second embodiment, the output difference (the difference between the absolute values of the outputs) between the left and right sensor elements 26a' and 26b' (that is, TsDr'–TsPa') are calculated, and a correction coefficient K2 are calculated on the basis of the output difference and a correction graph in FIG. 12.

Next, the corrected output values TsDr and TsPa for the detected sunlight amounts are calculated from the correction coefficient K2 and the output values TsDr' and TsPa' by using the following formulas (8) and (9).

$$TsDr = K2 \times TsDr' \quad (8)$$

$$TsPa = (2-K2) \times TsPa' \quad (9)$$

The outputs for the detected sunlight amounts are corrected on the basis of the output difference, so that an output ratio between the sensor outputs for the detected sunlight amounts by the left and right sensors can be improved when the sunlight enters the passenger compartment from the side, as shown in FIG. 9.

In each of the above embodiments, although the output values for the detected sunlight amounts of the sunlight sensors are corrected, the sunlight amount gain (sunlight amount correction coefficient) Ks may be corrected by the correction coefficient K1 or K2, and the target temperatures TAO(Dr) and TAO(Pa) of air blown out to the driver's seat side and to the passenger seat side in the passenger compartment may be calculated from the corrected sunlight amount gain Ks on the basis of the formulas (4) and (5). Accordingly, the same effects as mentioned above can be obtained.

Further, in each of the above embodiments, although the output values for the detected sunlight amounts of the right and left sunlight sensor elements 26a' and 26b' are corrected, the output value or the sunlight amount gain Ks of only one of sunlight sensor elements 26a' and 26b', the sunlight amount detected by which is larger than that by the other, may be corrected.

Further, in each of the above embodiments, photodiodes which output current is in proportion to the sunlight amount are used for the sensor elements 26a' and 26b' of the sunlight sensor 26, but solar cells for producing electromotive force according to the sunlight amount, or the like may be used for the sensor elements 26a' and 26b'.

Further, in each of the above embodiments, the corrected output value for the detected sunlight amounts TsDr and TsPa calculated from the detected sunlight amounts TsDr' and TsPa' of the sunlight sensor elements 26a' and 26b' are used in the formulas (4) and (5) as a factor of sunlight amount for calculating the target blown-out air temperatures TAO(Dr) and TAO(Pa). However, the detected sunlight amounts TsDr' and TsPa' may be used in the formulas (4) and (5) as the factor of sunlight amount for calculating the target blown-out air temperatures TAO(Dr) and TAO(Pa). Then, one of the target blown-out air temperatures TAO(Dr) and TAO(Pa) or both thereof may be corrected by the correction coefficient K1 of K2, and the same effects can be obtained.

Figure 13:
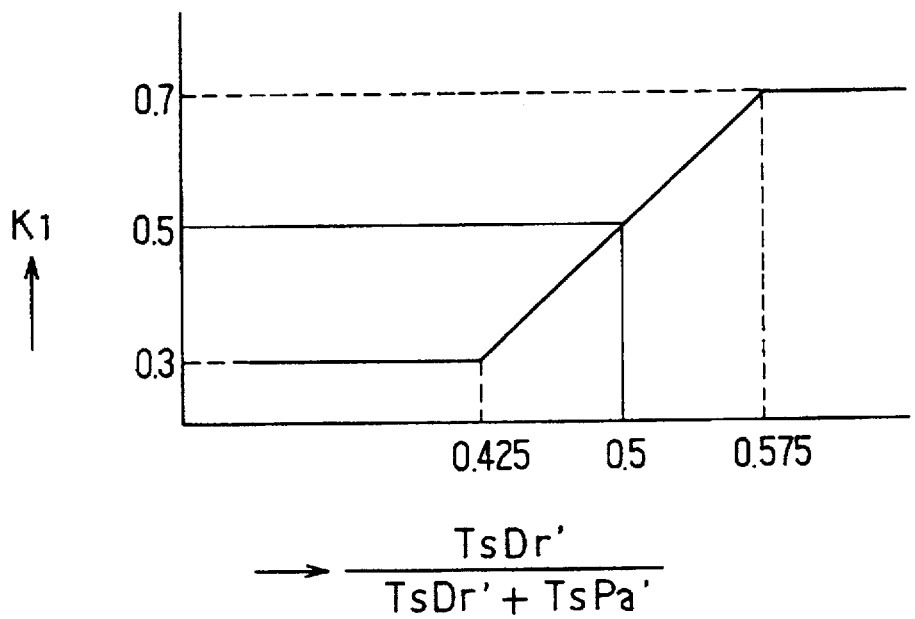
FIG. 13 is a graph for calculating a correction coefficient K1 in a modification of the present invention.

The correction graph for calculating the correction coefficient K1 is not limited to FIG.8. As shown in FIG. 13, a correction graph where the correction coefficient K1 changes linearly in response to the output ratio between the sensor outputs for the detected sunlight amounts by the right and left sensor elements 26a' and 26b' (Ts/(TsDr'+TsPa')) may be employed. In the correction map shown in FIG. 13, the correction coefficient K1 is set to be 0.5 when the output ratio is 0.5, so that the output ratio after the correction becomes equal to the output ratio before the correction (in other words, the correction is prohibited).

In the first embodiment shown in FIG. 1, the air conditioning apparatus, which includes the air mix doors 12 and 13 for independently controlling each temperature of the conditioned air blown out to the driver's seat side and the passenger seat side, is described. However, blowers capable of being controlled independently may be employed as blowing mean so as to independently control each amount of conditioned air blown out to the driver's seat side and the passenger seat side. Variable throttles (doors and the like) may be respectively disposed at the driver's seat side air passage and the passenger seat side air passage so as to independently control each amount of air blown out to the driver's seat side and the passenger seat side. The blowers and the variable throttles may be employed to independently control each amount of air blown out to the left and right in the vehicle.

Figure 14:
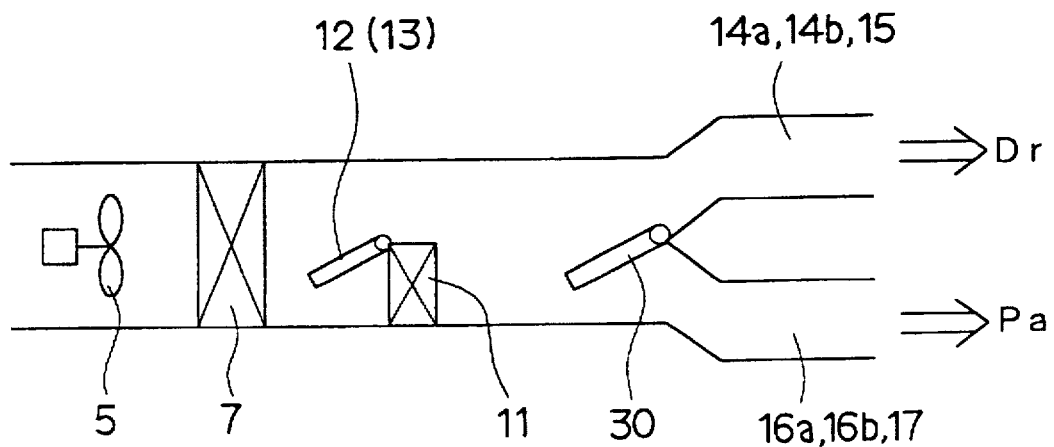
FIG. 14 is a diagram showing an airflow system of an air conditioning apparatus in another modification of the present invention.

Furthermore, as shown in FIG. 14, in an air conditioning apparatus where only one air mix door 12(13) is disposed in order to control the temperatures of air blown out to the driver's seat side and passenger seat side equally (each temperature of the left side and the right side are not controlled independently), a distributing air door 30 is disposed in order to control the distribution ratio between the amount of air blown out to the driver's seat side air outlet 14a, 14b, and 15 and the air amount blown out to the passenger seat side air outlet 16a, 16b, and 17. The present invention may be applied when the distribution ratio between the air amounts toward the left side and the right side in the vehicle is changed by controlling the opening degree of the door 30.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An air conditioning apparatus for a vehicle having a passenger compartment, comprising:
   first sunlight amount detecting means for detecting an amount of sunlight which enters a driver's seat side space in said passenger compartment and outputting a sunlight amount signal according to the detected value;
   second sunlight amount detecting means for detecting an amount of sunlight which enters a passenger seat side space in said passenger compartment and outputting a sunlight amount signal according to the detected value;
   changing means for differentially changing the amounts of sunlight detected by said first and second sunlight amount detecting means in response to a side direction in which sunlight enters said passenger compartment, said side direction having a non-zero azimuth angle;
   sunlight direction changing means for changing a sunlight direction so that said amounts of sunlight which enters said first and second sunlight amount detecting means becomes larger when an elevation angle of sunlight which enters said passenger compartment is small;
   air conditioning means for controlling states of conditioned air blown out into said driver's seat side space and said passenger seat side space;
   first air target value calculating means for calculating a first target value of air blown out into said driver's seat side space, on the basis of interior environmental factors including sunlight amount to be detected by said first sunlight amount detecting means;
   second air target value calculating means for calculating a second target value of air blown out into said passenger seat side space, on the basis of said interior environmental factors including sunlight amount to be detected by said second sunlight amount detecting means; and
   air conditioning control means for controlling said air conditioning means on the basis of said first and second target values calculated by said first and second target value calculating means; wherein
   said first and second air target value calculating means correct at least one of said first and second target values so that a difference between said states of conditioned air blown out into said driver's seat side space and said passenger seat side space becomes larger, when a ratio or a difference, between said sunlight amount signals of said first and second sunlight amount detecting means is within a predetermined range.

2. An air conditioning apparatus according to claim 1, wherein;
   said air conditioning means controls at least one of a temperature and an amount of air blown out to said driver's seat side space and said passenger seat side space.

3. An air conditioning apparatus according to claim 1, wherein;
   said air conditioning means includes first air conditioning means for controlling a state of conditioned air blown out into said driver's seat side space and second air conditioning means for controlling a state of conditioned air blown out into said passenger seat side space.

4. An air conditioning apparatus according to claim 3, wherein;
   said first and second air conditioning means control at least one of a temperature and an amount of air blown out to said driver's seat side space and said passenger seat side space.

5. An air conditioning apparatus according to claim 1, wherein;
   said first and second air target value calculating means independently calculate a first temperature control target value in said driver's seat side space and a second temperature control target value in said passenger seat side space on the basis of interior environmental factors including said sunlight amounts, and said air conditioning control means controls said air conditioning means on the basis of said first and second temperature control target values.

6. An air conditioning apparatus according to claim 1, further comprising:
   a filter member through which sunlight enters said first and second sunlight amount detecting means.

7. An air conditioning apparatus according to claim 6, wherein said sunlight direction changing means is a lens structure integrally formed with said filter member.

8. An air conditioning apparatus according to claim 1 wherein, said changing means comprises a shading member which differentially changes irradiated areas of said first and second sunlight amount detecting means.

9. An air conditioning apparatus according to claim 8 wherein, said shading member has a hole positioned above said first and second sunlight amount detecting means, and sunlight enters said first and second sunlight amount detecting means through said hole.

10. An air conditioning apparats for a vehicle having a passenger compartment, comprising:
    first sunlight amount detecting means for detecting an amount of sunlight which enters a driver's seat side space in said passenger compartment and outputting a sunlight amount signal according to the detected value;
    second sunlight amount detecting means for detecting an amount of sunlight which enters a passenger seat side space in said passenger compartment and outputting a sunlight amount signal according to the detected value;
    changing means for differentially changing the amounts of sunlight detected by said first and second sunlight amount detecting means in response to a side direction in which sunlight enters said passenger compartment, said side direction having a non-zero azimuth angle;
    sunlight direction changing means for changing a sunlight direction so that said amounts of sunlight which enters to said first and second sunlight amount detecting means becomes larger when an elevation angle of sunlight which enters said passenger compartment is small;
    air conditioning means for controlling states of conditioned air blown out into said driver's seat side space and said passenger seat side space;

control means for controlling said air conditioning means on the basis of interior environmental factors including sunlight amounts to be detected by said first and second sunlight amount detecting means; and sunlight amount correcting means for correcting at least one of said sunlight amount signals of said first and second sunlight amount detecting means so that a ratio or a difference, between said sunlight amount signals becomes larger when said ratio or said difference, between said sunlight amount signals is within a predetermined range.

11. An air conditioning apparatus according to claim 10, wherein;

said air conditioning means includes first air conditioning means for controlling a state of conditioned air blown out into said driver's seat side space and second air conditioning means for controlling a state of conditioned air blown out into said passenger seat side space.

12. An air conditioning apparatus according to claim 10, wherein;

said air conditioning means controls at least one of a temperature and an amount of air blown out to said driver's seat side space and said passenger seat side space.

13. An air conditioning apparatus according to claim 10, wherein;

said control means independently calculates a first temperature control target value in said driver's seat side space and a second temperature control target value in said passenger seat side space on the basis of interior environmental factors including said sunlight amounts, and independently controls said air conditioning means on the basis of said first and second temperature control target values.

14. An air conditioning apparatus according to claim 10, further comprising:

a filter member through which sunlight enters said first and second sunlight amount detecting means.

15. An air conditioning apparatus according to claim 14, wherein said sunlight direction changing means is a lens structure integrally formed with said filter member.

16. An air conditioning apparatus according to claim 10, wherein;

said sunlight amount correcting means includes first sunlight amount correcting means for calculating said ratio or said difference, between said sunlight amount signals, second sunlight amount correcting means for calculating a correction coefficient on the basis of said ratio or said difference calculated by said first sunlight amount correcting means, and third sunlight amount correcting means for correcting said sunlight amount signals on the basis of said correction coefficient calculated by said second sunlight amount correcting means.

17. An air conditioning apparatus according to claim 16, wherein;

said correction coefficient is kept at an upper limit value when said ratio or said difference between said sunlight amount signals is equal to a predetermined value or more, while kept at a lower limit value when said ratio or said difference between said sunlight amount signals is lower than a predetermined value.

18. An air conditioning apparatus according to claim 10, wherein;

said sunlight amount correcting means is prohibited from performing a correction of said sunlight amount signals when said sunlight amount signals are within a predetermined range.

19. An air conditioning apparatus according to claim 10 wherein, said changing means comprises a shading member which differentially changes irradiated areas of said first and second sunlight amount detecting means.

20. An air conditioning apparatus of a vehicle having a passenger compartment, comprising:

a first sunlight sensor so arranged as to detect an amount of sunlight which enters a driver's seat side space and output a first sunlight amount signal on the basis of the detected value;

a second sunlight sensor so arranged as to detect an amount of sunlight which enters a passenger seat side space and output a second sunlight amount signal on the basis of the detected value;

an optical transparent member arranged above the first and second sunlight sensors and including a prism portion which changes a direction of sunlight passing therethrough;

a changing member so arranged as to differentially change amounts of sunlight entering said first and second sunlight amount detecting means in response to an amount of sunlight entering said passenger compartment in a side direction having a non-zero azimuth angle;

sunlight amount correcting means for correcting at least one of said first and second sunlight amount signals outputted from said first and second sunlight sensors, respectively, when one of a ratio and a difference between said sunlight amount signals is within a predetermined range; and air conditioning means for controlling states of conditioned air blown out into said driver's seat side space and said passenger seat side space, on the basis of interior environmental factors including the first and second sunlight amount signals corrected by said sunlight amount correcting means.

21. An air conditioning apparatus for a vehicle having a passenger compartment, comprising:

first sunlight amount detecting means for detecting an amount of sunlight which enters a driver's seat side space in said passenger compartment and outputting a first sunlight amount signal according to the detected value;

second sunlight amount detecting means for detecting an amount of sunlight which enters a passenger seat side space in said passenger compartment and outputting a second sunlight amount signal according to the detected value;

changing means for differentially changing amounts of sunlight detected by said first and second sunlight amount detecting means in response to an amount of sunlight entering said passenger compartment in a side direction having a non-zero azimuth angle;

sunlight direction changing means for changing a sunlight direction so that said amounts of sunlight which enters said first and second sunlight amount detecting means becomes larger when an elevation angle of sunlight which enters said passenger compartment is small;

air conditioning means for controlling states of conditioned air blown out into said driver's seat side space and said passenger seat side space;

first air target value calculating means for calculating a first target value of air blown out into said driver's seat side space, on the basis of interior environmental factors including sunlight amount to be detected by said first sunlight amount detecting means;

second air target value calculating means for calculating a second target value of air blown out into said passenger seat side space, on the basis of interior environmental factors including sunlight amount to be detected by said second sunlight amount detecting means; and air conditioning control means for controlling said air conditioning means on the basis of said first and second target values calculated by said first and second target value calculating means; wherein said first and second air target value calculating means correct at least one of said first and second target values so that a difference between said states of conditioned air blown out into said driver's seat side space and said passenger seat side space becomes larger, when a ratio or a difference, between said first and second sunlight amount signals of said first and second sunlight amount detecting means is within a predetermined range.

* * * * *